(12) United States Patent
Kado (10) Patent No.: US 7,373,104 B2
(45) Date of Patent: May 13, 2008

(54) SIGNAL RELAY APPARATUS AND METHOD FOR A WIRELESS NETWORK

(75) Inventor: Youiti Kado, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 348 days.

(21) Appl. No.: 10/999,007

(22) Filed: Nov. 30, 2004

(65) Prior Publication Data

US 2005/0122931 A1  Jun. 9, 2005

(30) Foreign Application Priority Data

Dec. 5, 2003  (JP) .............................. 2003-406993

(51) Int. Cl.
*H04B 3/36* (2006.01)
(52) U.S. Cl. .......................... 455/7; 455/11.1; 455/21; 455/18; 370/328
(58) Field of Classification Search ................ 370/389, 370/310–350; 455/11.1, 18, 21
See application file for complete search history.

(56) References Cited

U.S. PATENT DOCUMENTS 6,132,306 A * 10/2000 Trompower ................. 455/11.1
6,690,657 B1 * 2/2004 Lau et al. .................... 370/315

FOREIGN PATENT DOCUMENTS

| JP | 3-212032 A | 9/1991 |
|---|---|---|
| JP | 2000-101454 A | 4/2000 |
| JP | 2001-244983 | 9/2001 |
| JP | 2001-345754 A | 12/2001 |
| JP | 2002-152098 A | 5/2002 |
| JP | 2003-115842 A | 4/2003 |
| JP | 2003-406993 | 11/2007 |

OTHER PUBLICATIONS

Japanese Office Action issued Jan. 29, 2008 in the corresponding JP application 2003-406993 with an English translation.

* cited by examiner

Primary Examiner—Rafael Perez-Gutierrez
Assistant Examiner—Amancio González
(74) Attorney, Agent, or Firm—Rabin & Berdo, P.C.

(57) ABSTRACT

A signal relaying apparatus includes a plurality of devices for relaying signals to and from distant nodes in a wireless communication network. At least one of the devices is an antenna; the devices may also include one or more cables. The devices are connectable to a transmitter and a receiver in the apparatus. The receiver receives a signal from one node through one of the devices; the transmitter transmits the same signal to another node through another of the devices. The signal may also be amplified or buffered before being transmitted. Because the signal is transmitted and received through different devices, the transmission of a signal packet can begin while the packet is still being received, thereby shortening the delay from reception to transmission, as compared with the delay in conventional apparatus that both receives and transmits the packet through a single antenna.

12 Claims, 9 Drawing Sheets

SIGNAL RELAY APPARATUS AND METHOD FOR A WIRELESS NETWORK

BACKGROUND OF THE INVENTION

1. Field of the Invention

The present invention relates to the relay of signals in a wireless network.

2. Description of the Related Art

In a wireless network, such as an ad hoc network, in which a signal is relayed from a source node to a destination node through a plurality of intermediate nodes, indiscriminately routed signals are apt to collide or interfere, causing transmission errors. Japanese Unexamined Patent Application Publication No. 2001-244983 therefore equips the intermediate nodes with directional beam antennas; by measuring the strength of signals received from various directions and keeping a table of signal strengths and directions, an intermediate node can select a neighboring node that will minimize both radio interference and the number of hops to the destination, and beam its signal to the selected node. Beaming signals in this way prevents transmission errors due to interference, and reduces power consumption as well. The same directional beam antenna is used for both transmitting and receiving, the beam direction being changed by, for example, electronic control of scanning intervals across a phased array of antenna elements.

A drawback of this arrangement is that the antenna cannot be used for transmitting and receiving simultaneously. Each continuously received signal packet must therefore be stored in a buffer memory. After the entire packet has been received, the antenna beam direction is switched, the stored signal is read from the buffer, and transmission begins. The relay process accordingly includes a delay at least equal to the length of the packet. Switching the antenna direction, converting the received signal to a form storable in the buffer, and switching the buffer between read and write access also adds slightly to the delay.

The delay accumulates from one relay node to the next. Particularly in a network employing low-power signal transmission, since the number of hops on a route tends to be large, the cumulative delay may become substantial. If the transmitted signal is an audio or video signal, the delay may seriously impair the quality of the received sound or picture.

SUMMARY OF THE INVENTION

An object of the present invention is to reduce the transmission delay of signals transmitted in a wireless communication network.

The signal relaying apparatus according to the present invention includes a plurality of devices for relaying signals to and from distant nodes in the network. At least one of the devices is an antenna device, but the devices may include one or more cable devices as well. The apparatus also includes a receiver that receives a signal through one of the devices and a transmitter that transmits the same signal through another of the devices, and may include an additional intermediate unit for amplifying or temporarily storing the received signal before it is transmitted. The apparatus may further include a switch for connecting the receiver to an arbitrary one of the devices while connecting the transmitter to another arbitrary one of the devices.

If the devices are antennas, then by using two antennas simultaneously, the invented apparatus avoids the need to store an entire continuously received packet in a signal buffer before beginning transmission of the packet on the next hop. Even if a signal buffer is employed, transmission of the packet through one antenna can begin while the packet is still being received through another antenna. Delays are thereby shortened, and high transmission quality can be maintained, even for audio and video signals. Similar advantages are obtained when one or more of the devices are cables.

DETAILED DESCRIPTION OF THE INVENTION

Embodiments of the invention will now be described with reference to the attached drawings, in which similar elements are indicated by analogous reference characters (e.g., three-digit numbers differing only in the first digit).

Figure 1:
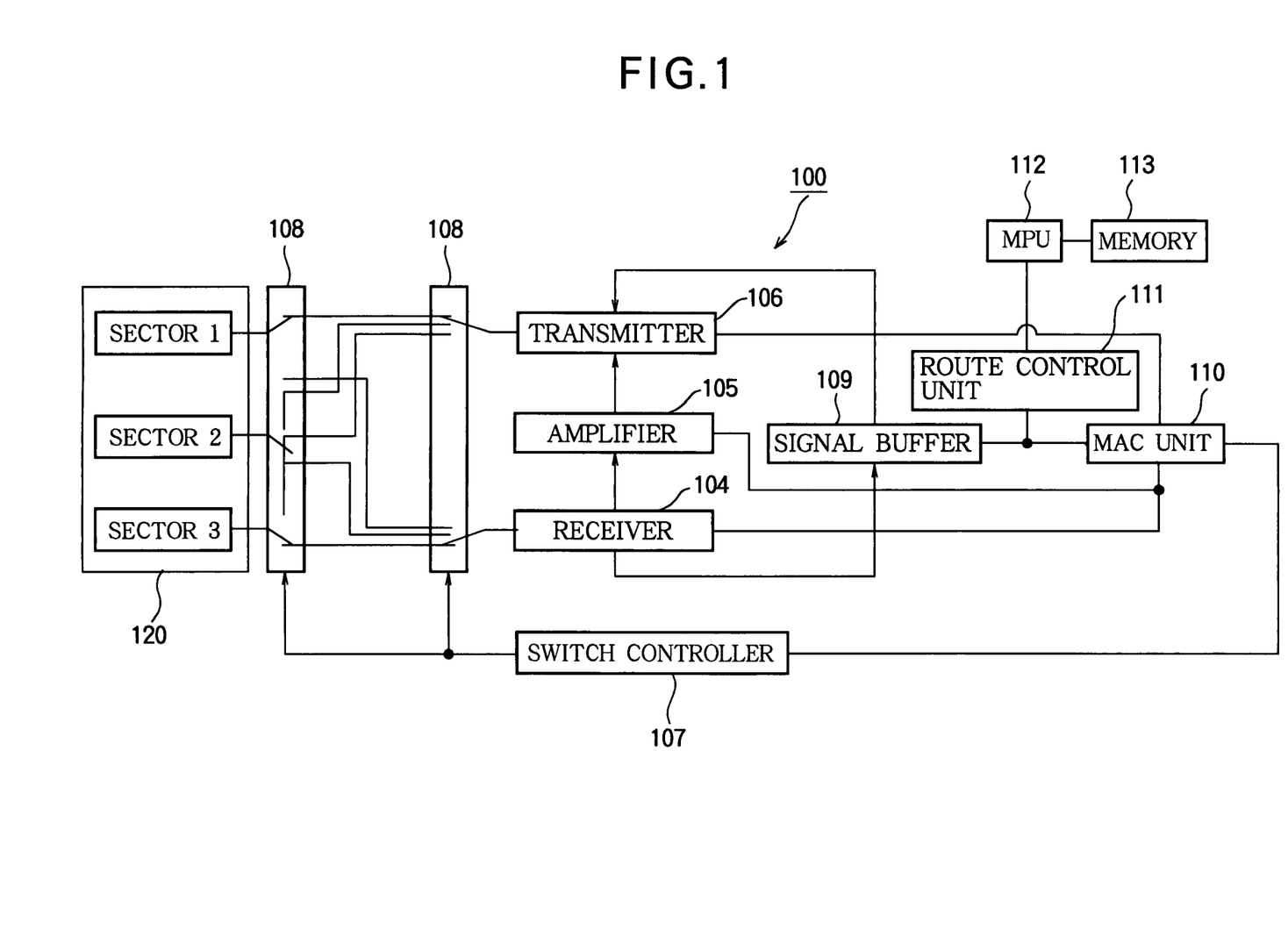
FIG. 1 is a block diagram of a signal relaying apparatus according to a first embodiment of the invention.

Referring to FIG. 1, the signal relaying apparatus 100 in the first embodiment has a sector antenna 120 with three antenna sectors 1, 2, 3, a receiver 104 that receives signals from distant nodes (not shown) through the sector antenna 120, an amplifier 105 that amplifies the received signals, a transmitter 106 that transmits signals to distant nodes through the sector antenna 120, a switch controller 107, a transmit/receive switch 108 that switches the connections among the receiver 104 and transmitter 106 and the antenna sectors 1, 2, 3 at the command of the switch controller 107, a signal buffer 109 that stores the signals received by the receiver 104, a media access control (MAC) unit 110, a route control unit 111 that controls the operation of the signal buffer 109 through the media access control unit 110, a microprocessor unit or MPU 112, and a memory 113 that stores a program executed by the MPU 112 to control the apparatus as a whole.

Figure 2:
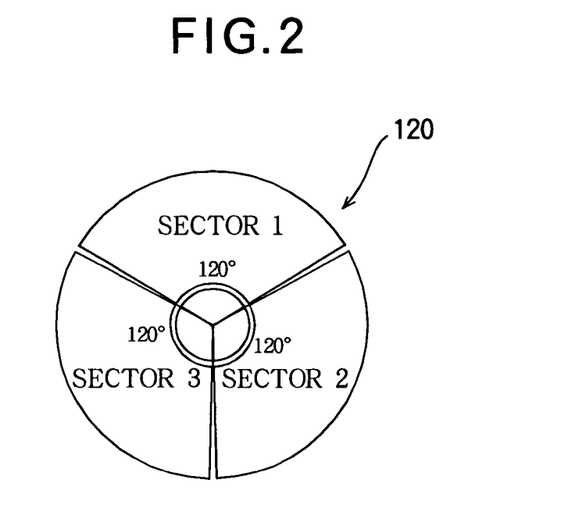
FIG. 2 illustrates antenna sectors in the first embodiment.

As shown in FIG. 2, the antenna sectors 1, 2, 3 in the sector antenna 120 comprise respective directional antennas that radiate signals over 120-degree horizontal sectors and receive signals from these same 120-degree sectors.

The signal relaying apparatus 100 can operate in two different relay modes: a signal amplifying mode and a signal buffering mode. In the signal buffering relay mode, the radio-frequency signal received by one antenna sector is demodulated and temporarily stored in the signal buffer 109, then modulated onto a carrier signal and transmitted from a different antenna sector. In the signal amplifying relay mode, the received radio-frequency signal is amplified and transmitted from the other antenna sector immediately, without being demodulated or stored in the signal buffer. Which mode to use is determined by the route control unit 111 from, for example, priority information included in the received signal, or in control signals transmitted and received among different base stations.

The signal amplifying relay mode operates as follows. On command from the route control unit 111, the media access control unit 110 has the switch controller 107 connect the receiver 104 to, for example, sector 3 of the sector antenna 120 and the transmitter 106 to, for example, sector 1. The amplifier 105 receives the radio-frequency signal received from sector 3 through the receiver 104, amplifies it, and sends it to the transmitter 106. The transmitter 106 transmits the amplified received signal from sector 1 on the next hop toward its ultimate destination. The frequency at which sector 1 receives the signal and the frequency at which sector 3 transmits the signal may be the same or may differ. For example, the frequency may be down-converted in the receiver 104, then up-converted to a different frequency in the transmitter 106. In either case, because the received signal is not stored in the signal buffer 109, the delay from receiving to transmitting is very small, being equal only to the signal propagation delay in the electrical circuit elements of the signal relaying apparatus.

The signal buffering relay mode operates as follows. On command from the route control unit 111, the media access control unit 110 has the switch controller 107 connect the receiver 104 to, for example, sector 3 of the sector antenna 120 and the transmitter 106 to, for example, sector 1. The radio-frequency signal received by sector 3 is demodulated by the receiver 104, and the demodulated signal is sent to the signal buffer 109 and stored. The signal stored in the signal buffer 109 is read out at a fixed transmission timing and sent to the transmitter 106. The transmitter 106 modulates the signal onto a carrier signal and transmits it from sector 1 on the next hop toward the destination. The delay from receiving to transmitting is longer in this mode than in the signal amplifying relay mode, but the delay is shorter than in the conventional apparatus described above, because transmission of a continuously received signal packet through one antenna sector can begin while the packet is still being received through another antenna sector.

Figure 3:
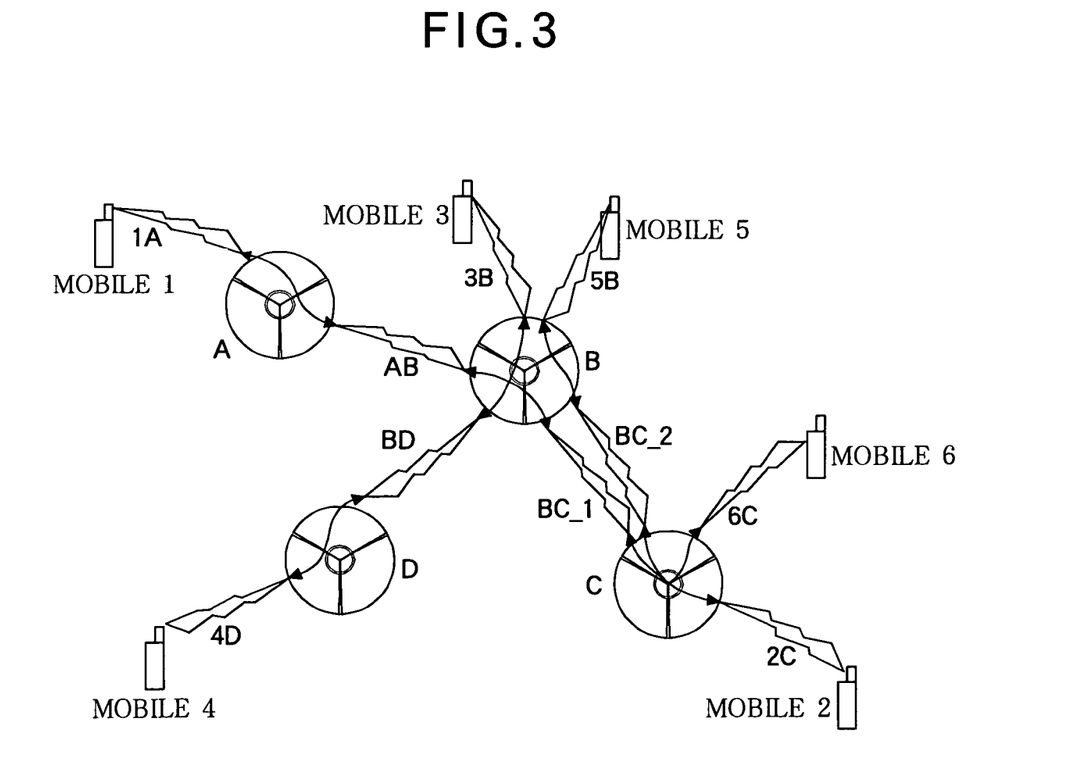
FIG. 3 illustrates links in a wireless communication network having a plurality of base stations including the signal relaying apparatus of FIG. 1.

Next, an example of signal propagation through a mobile wireless communication network having a plurality of relay nodes will be described with reference to FIG. 3. The relay nodes are base stations A, B, C, D equipped with signal relaying apparatus of the type described above, which they use to relay signals among mobile terminals 1 to 6 (denoted 'mobile 1' to 'mobile 6' for brevity in the drawing). When mobile terminal 1 communicates with mobile terminal 2, for example, the communication path may consist of link 1A (a wireless link between mobile terminal 1 and base station A), link AB (a wireless link between base stations A and B), link BC_1 (a wireless link between base stations B and C), and link 2C (a wireless link between base station C and mobile terminal 2).

Figure 4:
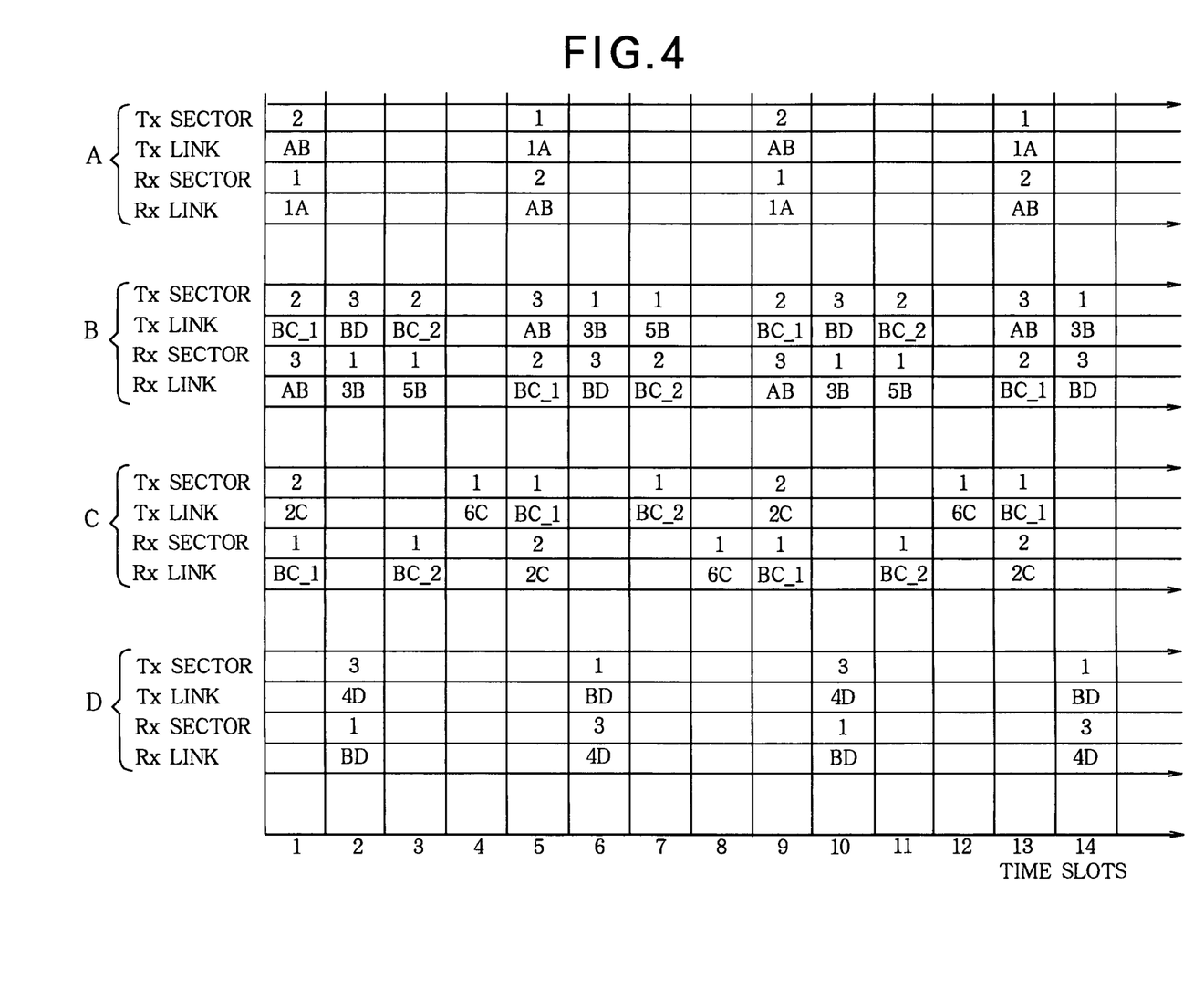
FIG. 4 illustrates the operations of the base stations in FIG. 3 in a series of time slots.

Referring to FIG. 4, each base station operates in time slots having a fixed duration. In the operation illustrated, in time slot 1 base station A connects its transmitter to antenna sector 2 and its receiver to antenna sector 1, using sector 1 to receive (Rx) signals from mobile terminal 1 and sector 2 to transmit (Tx) signals to base station B, thereby activating links 1A and AB. Similarly, base station B uses antenna sector 3 for receiving on link AB and antenna sector 2 for transmitting on link BC_1, and base station C uses antenna sector 1 for receiving on link BC_1 and antenna sector 2 for transmitting on link 2C. A communication path is thereby established from mobile terminal 1 through base stations A, B, and C, in that order, to mobile terminal 2.

In time slot 5, base station A uses antenna sector 1 for transmitting on link 1A and antenna sector 2 for receiving on link AB, base station B uses antenna sector 3 for transmitting on link AB and antenna sector 2 for receiving on link BC_1, and base station C uses antenna sector 1 for transmitting on link BC_1 and antenna sector 2 for receiving on link 2C, establishing a communication path from mobile terminal 2 through base stations C, B, and A, in that order, to mobile terminal 1.

The above operations are repeated in time slots 9 and 13. It is accordingly possible to carry out bi-directional communication between mobile terminals 1 and 2 without delay due to buffering (delay due to storage of the signal in a signal buffer) by using time slots 1, 5, 9, 13, and so on. Voice or video communication service can be provided between these mobile terminals in this way.

In like manner, base stations B and D relay communication between mobile terminals 3 and 4 in time slots 2, 6, 10, . . . ; base station B relays communication between mobile terminal 5 and base station C in time slot 3, 7, 11, . . . ; and mobile terminal 6 communicates directly with base station C in time slots 4, 8, 12, . . . . These time slots can be used to provide voice or video communication service between mobile terminals 3 and 4, between mobile terminal 5 and a stationary terminal (not shown) connected to base station C, and between mobile terminal 6 and another stationary terminal (not shown) connected to base station C. The time slots are assigned in a way that avoids signal interference and packet collisions.

Figure 5:
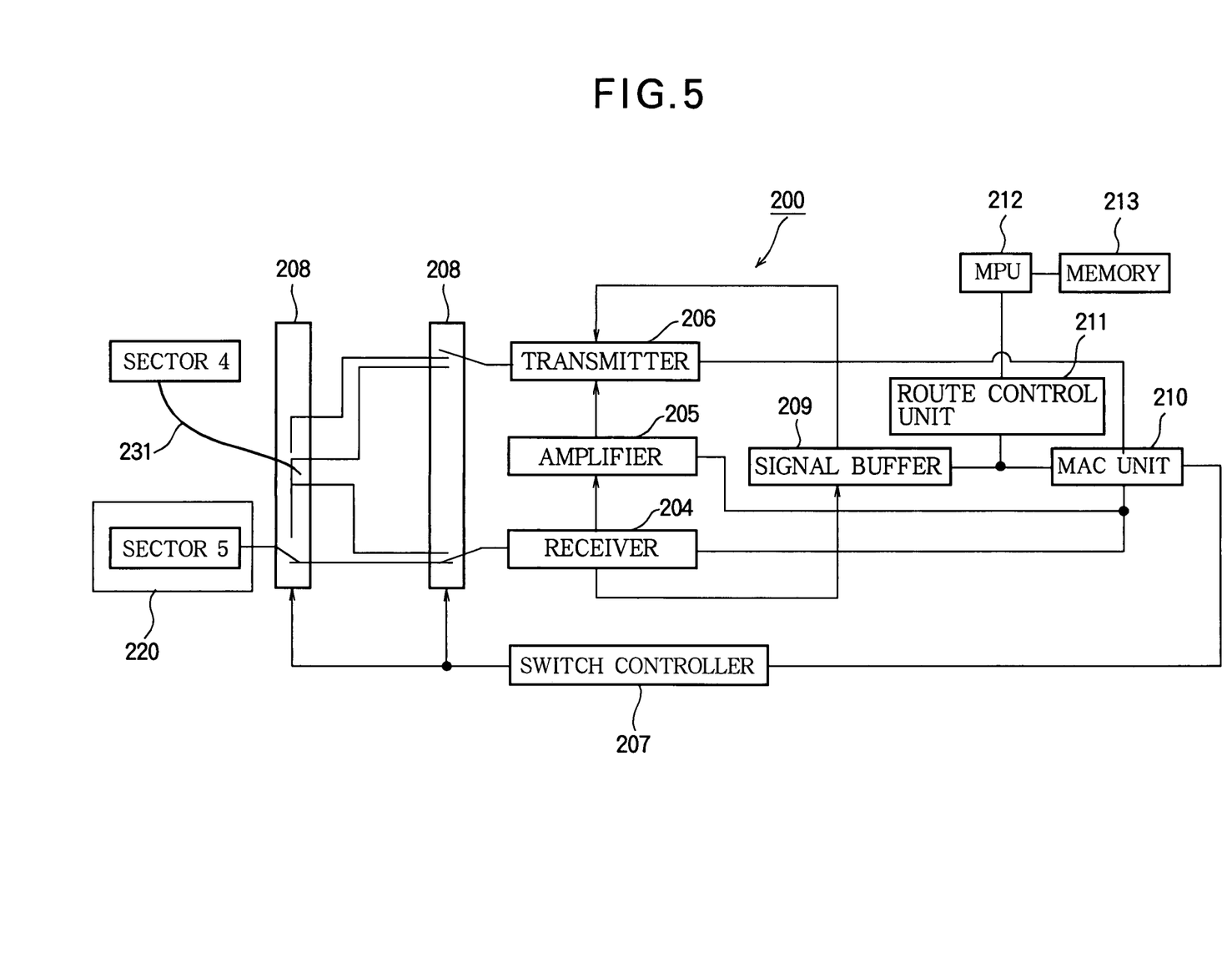
FIG. 5 is a block diagram of a signal relaying apparatus according to a second embodiment of the invention.

Referring to FIG. 5, the signal relaying apparatus 200 in the second embodiment has a sector antenna 220 with a single antenna sector 5, a receiver 204 that receives signals through the sector antenna 220 or a cable 231 (an optical fiber cable or radio-frequency coaxial electrical cable) connected to another signal relaying apparatus, an amplifier 205 that amplifies the received signals, a transmitter 206 that transmits signals through the sector antenna 220 or the cable 231, a switch controller 207, a transmit/receive switch 208 that switches the connections among the receiver 204 and transmitter 206 and antenna sector 5 and cable 231 at the command of the switch controller 207, a signal buffer 209 that stores the signals received by the receiver 204, a media access control unit 210, a route control unit 211 that controls the operations of the transmitter 206, amplifier 205, receiver 204, switch controller 207, and signal buffer 209 through the media access control unit 210, and an MPU 212 that executes a program stored in a memory 213 to control the apparatus as a whole.

Figure 6:
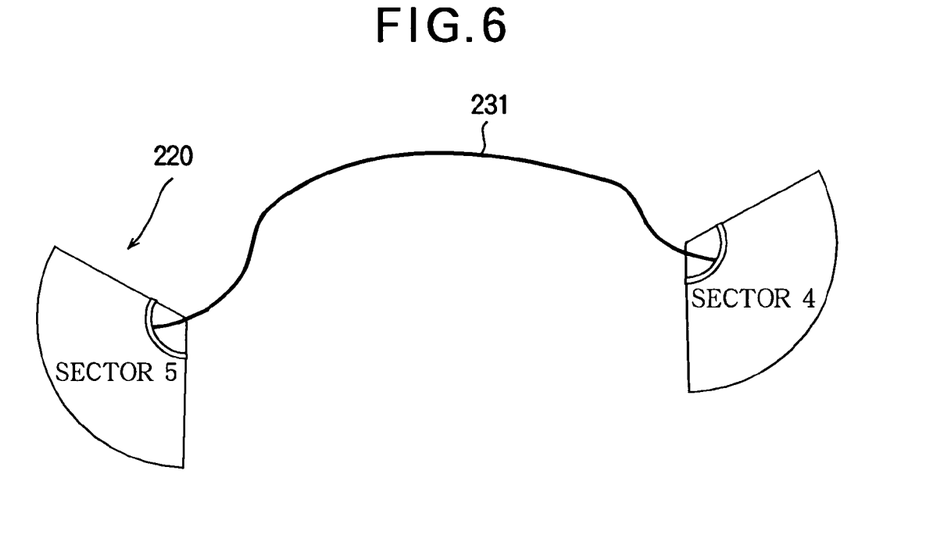
FIG. 6 illustrates a cable connection between signal relaying apparatus of the type shown in FIG. 5.

As shown in FIG. 6, the antenna sector 5 in the sector antenna 220 comprises a directional antenna that radiates signals over a 120-degree horizontal sector and receives signals from the same 120-degree sector. The antenna sector 5 is connected through the cable 231 to a similar antenna sector 4 at another similar signal relaying apparatus.

As in the first embodiment, the signal relaying apparatus 200 can operate in a signal amplifying relay mode and a signal buffering relay mode.

In the second embodiment, the signal amplifying relay mode operates as follows. At the command of the route control unit 211, the media access control unit 210 has the switch controller 207 connect the receiver 204 to, for example, the antenna sector 5 and the transmitter 206 to the cable 231. The amplifier 205 receives a signal received by the antenna sector 5 through the receiver 204, amplifies it, and sends it to the transmitter 206. The transmitter 206 transmits the amplified signal through the cable 231 to the antenna sector 4 at the other signal relaying apparatus. The other signal relaying apparatus then transmits the signal from the antenna sector 4 on the next hop toward the destination.

In this mode, the signal is received by the antenna (or cable) and transmitted through the cable (or antenna) without having to be stored in and read from the signal buffer 209. The delay from receiving to transmitting is therefore very small, being equal only to the signal propagation delay in the electrical and optical circuit elements of the signal relaying apparatus.

The signal buffering relay mode operates as follows. On command from the route control unit 211, the media access control unit 210 has the switch controller 207 connect the receiver 204 to, for example, the antenna sector 5 and the transmitter 206 to the cable 231. In this case, the radio-frequency signal received by antenna sector 5 is demodulated by the receiver 204, and the demodulated signal is sent to the signal buffer 209 and stored. The signal stored in the signal buffer 209 is read out at a fixed transmission timing and sent to the transmitter 206. The transmitter 206 modulates the signal onto a radio-frequency carrier signal and transmits it to the other signal relaying apparatus through the cable 231.

Figure 7:
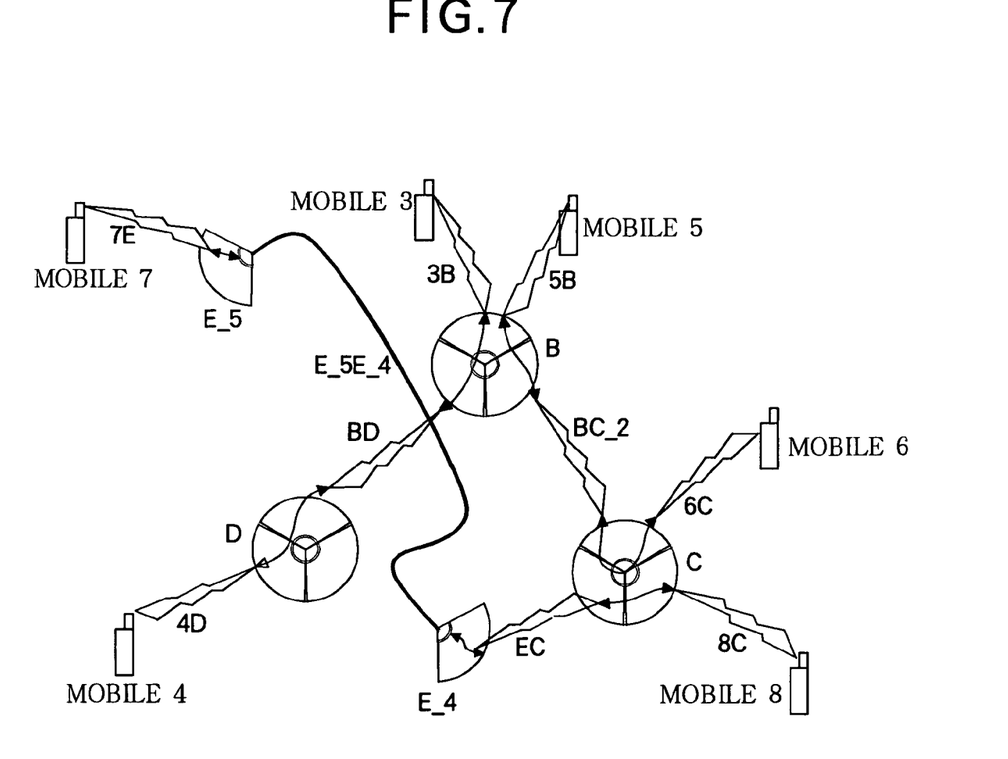
FIG. 7 illustrates links in a wireless communication network having a plurality of base stations including the signal relaying apparatus of FIG. 1 and a plurality of base stations including the signal relaying apparatus of FIG. 5.

Next, an example signal propagation through a mobile wireless communication network having a plurality of relay nodes with the signal relaying apparatus of the first embodiment and a plurality of base stations with the signal relaying apparatus of the second embodiment will be described with reference to FIG. 7. The relay nodes are base stations B, C, D, E_4, E_5 that relay signals among mobile terminals 1 to 8. Base stations B, C, and D have signal relaying apparatus of the type described in the first embodiment; base stations E_4 and E_5 have signal relaying apparatus of the type described in the second embodiment.

Figure 8:
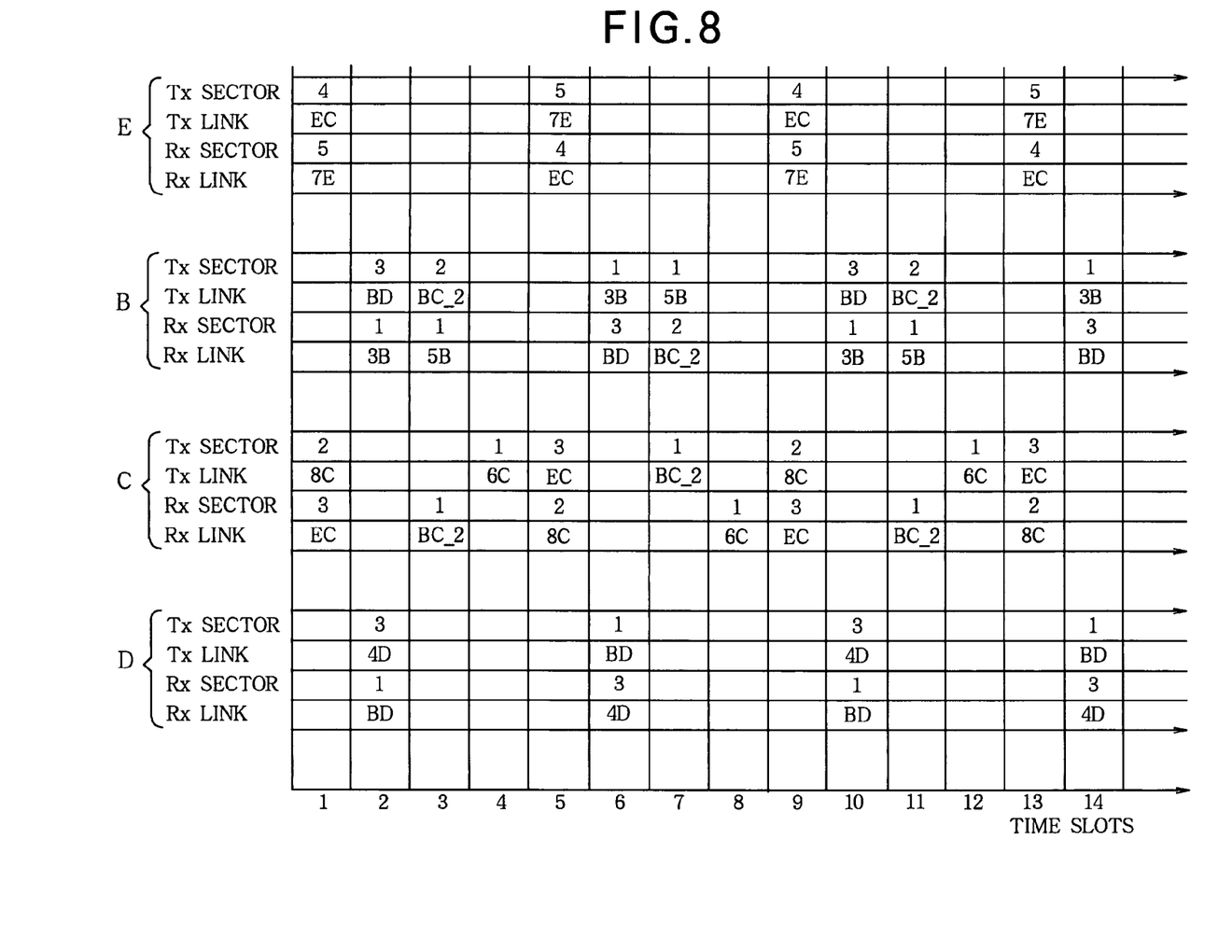
FIG. 8 illustrates the operations of the base stations in the wireless communication network in FIG. 7 in a series of time slots.

Each base station operates in time slots having a fixed duration as shown in FIG. 8. Since signals transmitted over the cable 231 between base stations E_4 and E_5 cannot collide or interfere with the radio-frequency signals transmitted from the sector antennas of the other base stations, base stations E_4 and E_5 operate in effect as a single base station E, and are so denoted in FIG. 8.

When mobile terminal 7 communicates with mobile terminal 8, the communication path may consist of, for example, link 7E (a wireless link between mobile terminal 7 and base station E_5), link E_5E_4 (the cable link between base stations E_5 and E_4), link EC (a wireless link between base stations E_4 and C), and link 8C (a wireless link between base station C and mobile terminal 8).

As can be seen from FIG. 8, in time slots 1 and 9, base stations E_5 and E_4 use antenna sector 5 for receiving on link 7E and antenna sector 4 for transmitting on link EC, and base station C uses sector 3 for receiving on link EC and sector 2 for transmitting on link 8C. In time slots 1 and 9, accordingly, a communication path is established from mobile terminal 7 through base stations E_5, E_4, and C, in that order, to mobile terminal 2. In time slots 5 and 13, base stations E_4 and E_5 use antenna sector 5 for transmitting on link 7E and antenna sector 4 for receiving on link EC, and base station C uses sector 3 for transmitting on link EC sector 2 for receiving on link 8C. In time slots 5 and 13, accordingly, a communication path is established from mobile terminal 8 through base stations C, E_4, and E_5, in that order, to mobile terminal 7. It is accordingly possible to carry out bi-directional communication between mobile terminals 7 and 8 without delay due to buffering (delay due to storage of the signal in a signal buffer) by using time slots 1, 5, 9, 13, and so on. The other time slots in FIG. 8 are used in the same way as in the first embodiment.

Like the first embodiment, the second embodiment can provide voice or video communication service between even distant mobile terminals without the accumulation of long delays at relay nodes en route. In addition, by connecting one or more pairs of mutually separated base stations with optical fiber cables, the second embodiment can reduce the number of wireless relay hops, thereby reducing interference and simplifying the routing of signals.

Figure 9:
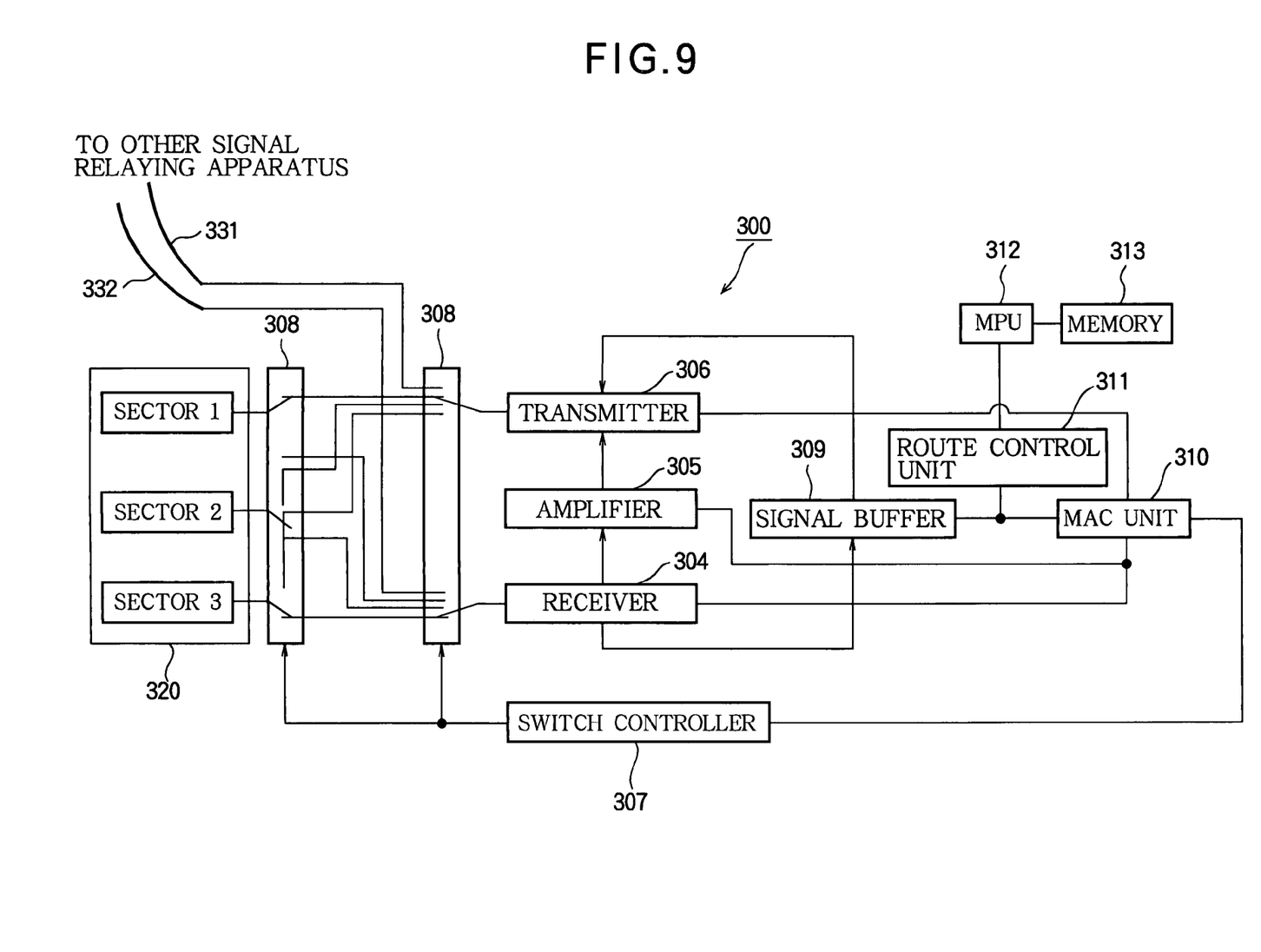
FIG. 9 is a block diagram of a signal relaying apparatus according to a third embodiment of the invention.

Referring to FIG. 9, the signal relaying apparatus 300 in the third embodiment has a sector antenna 320 with three antenna sectors 1, 2, 3, a receiver 304 that receives signals through the sector.antenna 320 or a cable 332 (an optical fiber cable or radio-frequency coaxial cable) connected to another signal relaying apparatus, an amplifier 305 that amplifies the received signals, a transmitter 306 that transmits signals through the sector antenna 320 or a cable 331 (another optical fiber cable or radio-frequency coaxial cable), a switch controller 307, a transmit/receive switch 308 that switches the connections among the receiver 304 and transmitter 306 and the antenna sectors 1, 2, 3, and cables 331 and 332 at the command of the switch controller 307, a signal buffer 309 that stores the signals received by the receiver 304, a media access control unit 310, a route control unit 311 that controls the operation of the signal buffer 309 through the media access control unit 310, and an MPU 312 that executes a program stored in a memory 313 to control the apparatus as a whole. The apparatus operates selectively in a signal amplifying relay mode and a signal buffering relay mode.

Figure 10:
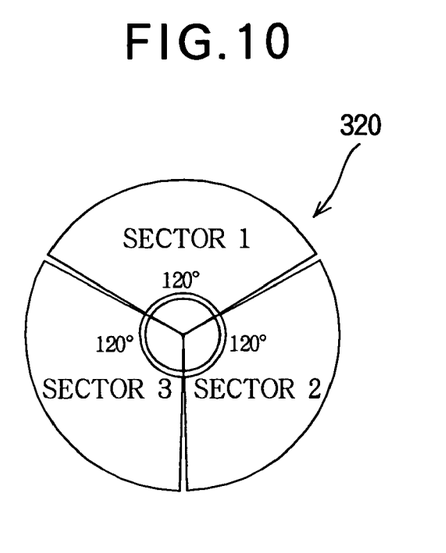
FIG. 10 illustrates antenna sectors in the third embodiment.

As shown in FIG. 10, the antenna sectors 1, 2, 3 in the sector antenna 320 include respective directional antennas that radiate signals over 120-degree horizontal sectors and receive signals from these 120-degree sectors.

The signal amplifying relay mode in the third embodiment operates, for example, as follows. At the command of the route control unit 311, the media access control unit 310 has the switch controller 307 connect the receiver 304 to sector 3 and the transmitter 306 to cable 331. The amplifier 305 receives a radio-frequency signal received by sector 3 through the receiver 304, amplifies it, and sends it to the transmitter 306. The transmitter 306 transmits the amplified radio-frequency signal through cable 331 to the other signal relaying apparatus. Needless to say, the switch may controller may connect the receiver 304 to cable 332 instead of an antenna sector, and may connect the transmitter 306 to an antenna sector instead of cable 331.

In this mode, the signal is received by an antenna (or a cable) and transmitted through a cable (or an antenna) without having to be stored in and read from the signal buffer. The delay from receiving to transmitting is therefore very small, being equal only to the signal propagation delay in the electrical and optical circuit elements of the signal relaying apparatus.

The signal buffering relay mode operates as follows. On command from the route control unit 311, the media access control unit 310 has the switch controller 307 connect the receiver 304 to, for example, sector 3 and the transmitter 306 to, for example, cable 331. The radio-frequency signal received by sector 3 is demodulated by the receiver 304, and the demodulated signal is sent to the signal buffer 309 and stored. The signal stored in the signal buffer 309 is read out at a fixed transmission timing and sent to the transmitter 306. The transmitter 306 modulates the signal onto a radio-frequency carrier signal and transmits it to the other signal relaying apparatus through cable 331.

Figure 11:
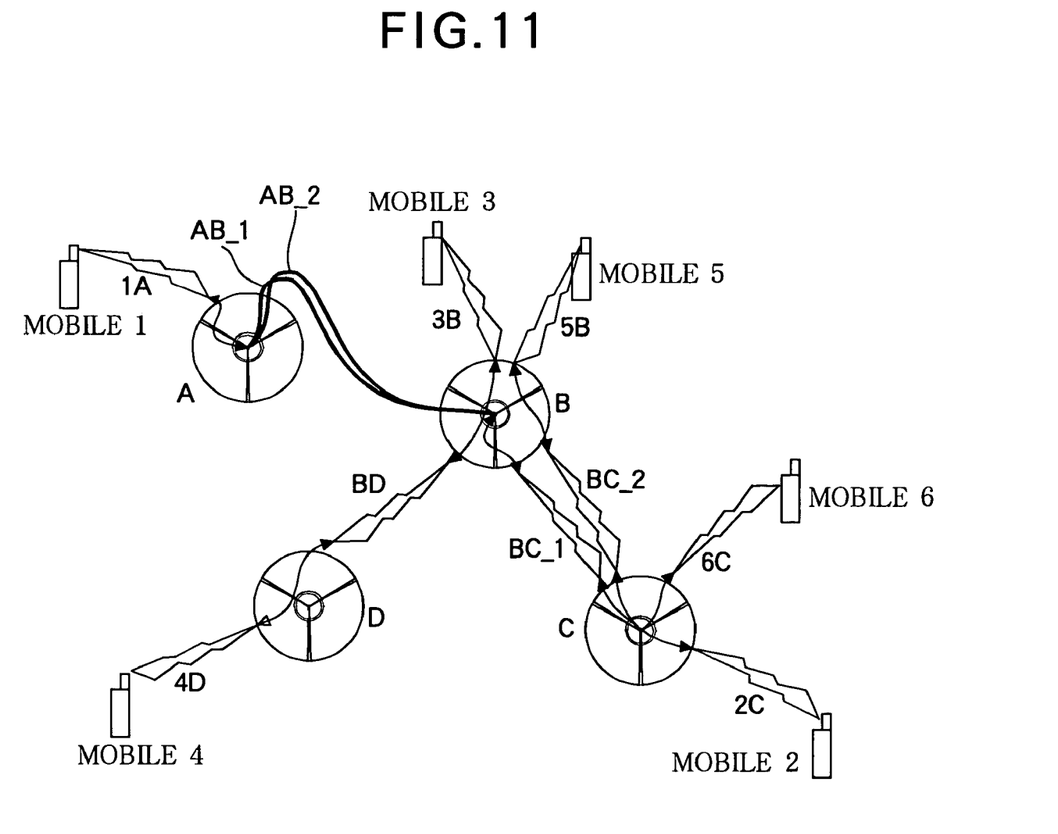
FIG. 11 illustrates links in a wireless communication network having a plurality of base stations including the signal relaying apparatus of FIG. 1 and a plurality of base stations including the signal relaying apparatus of FIG. 9.

Next, an example of signal propagation through a wireless communication network having a plurality of relay nodes with the signal relaying apparatus of the first embodiment and a plurality of relay nodes with the signal relaying apparatus of the third embodiment will be described with reference to FIG. 11. The relay nodes are base stations that are designated A, B, C, and D that relay. signals among mobile terminals 1 to 6. Base stations A and B have signal relaying apparatus of the type described in the third embodiment. Base stations C and D have signal relaying apparatus of the type described in the first embodiment. The network in FIG. 11 has the same topology as shown in the first embodiment (FIG. 3), but the wireless link between base stations A and B is replaced by a pair of cable links.

When mobile terminal 1 communicates with mobile terminal 2, the communication path may consist of, for example, link 1A (a wireless link between mobile terminal 1 and base station A), links AB_1 and AB_2 (cable links between base station A and base station B), link BC_1 (a wireless link between base stations B and C), and link 2C (a wireless link between base station C and mobile terminal 2).

Figure 12:
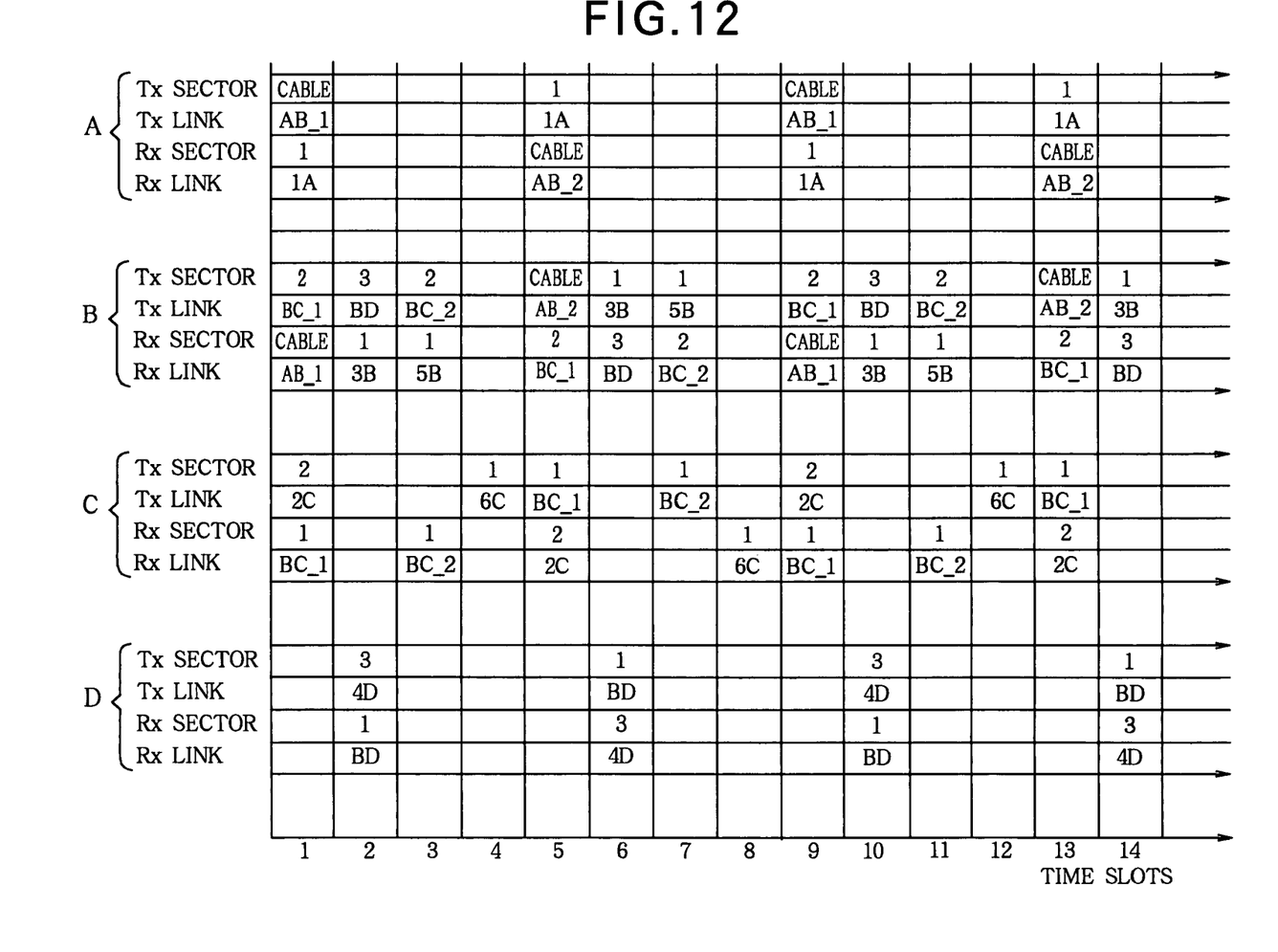
FIG. 12 illustrates the operations of the base stations in the wireless communication network in FIG. 11 in a series of time slots.

This communication path is implemented in time slots 1, 5, 9 and 13 in FIG. 12. In time slots 1 and 9, base station A uses sector 1 for receiving on link 1A and a first cable for transmitting on link AB_1, base station B uses the same cable for receiving on link AB_1 and sector 2 for transmitting on link BC_1, and base station C uses sector 1 for receiving on link BC_1 and sector 2 for transmitting on link 2C. In time slots 1 and 9, accordingly a communication path is established from mobile terminal 1 through base stations A, B, and C, in that order, to mobile terminal 2. In time slots 5 and 13, base station A uses sector 1 for transmitting on link 1A and a second cable for receiving on link AB_2, base station B uses the second cable for transmitting on link AB_2 and sector 2 for receiving on link BC_1, and base station C uses sector 1 for transmitting on link BC_1 and sector 2 for receiving on link 2C. In time slots 5 and 13, accordingly a communication path is established from mobile terminal 2 through base stations C, B, and A, in that order, to mobile terminal 1. The other time slots in FIG. 12 are used in the same way as in the first embodiment.

Like the preceding embodiments, the third embodiment enables bi-directional communication between even distant mobile terminals 1 and 2 to take place without long cumulative delays due to buffering en route. In addition, the third embodiment allows base stations to be interconnected by cable links that are selected and used in substantially the same way as the wireless links; accordingly, when wireless communication resources become inadequate, further communication resources can be added with cables, without increasing the number of relay nodes.

The present invention is suitable for short-haul networks such as local area networks (LANs) in which the wireless propagation delay is negligible and time slot alignment poses no particularly problems, but the invention may also be practiced in long-haul networks if the base stations exchange information about the wireless propagation delay and adjust their transmission timing so that the signals arriving in different time slots at a given node are properly separated on the time axis.

In the embodiments described above, the signal relaying apparatus has a structure that enables it to operate in both signal amplifying and signal buffering relay modes, but it may also have a structure in which it can operate in just one of these two modes.

Those skilled in the art will recognize that further variations are possible within the scope of the invention, which is defined in the appended claims.

What is claimed is:

1. An apparatus for relaying signals in a wireless communication network, comprising:
  a plurality of devices for relaying signals to and from respective distant nodes in the wireless communication network, said plurality of devices including at least one antenna device;
  a receiver for receiving a first signal through one of said devices and selectively demodulating said first signal;
  a transmitter for selectively modulating a second signal and transmitting said second signal through another one of said devices; and
  an intermediate unit for receiving the first signal from the receiver and supplying the first signal as the second signal to the transmitter; wherein said intermediate unit includes an amplifier and a buffer; and
  a control unit for controlling the intermediate unit to operate in a first mode in which the amplifier is used to amplify the first signal at its received frequency, without demodulation in the receiver, thereby producing the second signal, which is transmitted without modulation in the transmitter, and a second mode in which the buffer is used to store the first signal after demodulation in the receiver, and the transmitter generates a carrier signal as the second signal, modulates the carrier signal according to the demodulated and stored first signal, and transmits the modulated carrier signal.

2. The apparatus of claim 1, further comprising a switch for connecting the receiver selectively to any one of said plurality of devices and connecting the transmitter selectively to any other one of said plurality of devices.

3. The apparatus of claim 1, wherein said plurality of devices are directional antennas relaying said signals in different directions.

4. The apparatus of claim 1, wherein said plurality of devices includes at least one cable device.

5. The apparatus of claim 1, wherein said plurality of devices includes at least two antenna devices and at least two cable devices.

6. The apparatus of claim 1, wherein the first signal includes priority information and the control unit selects the first mode and the second mode according to said priority information.

7. A method of relaying a signal from a first node through a second node to a third node in a wireless communication network, comprising:
  receiving the signal through a first device at the second node; and
  selecting one of a first mode and a second mode;

in the first mode, routing the signal at its received frequency, without demodulation, through an amplifier at the second node and transmitting the signal without modulation through a second device at the second node; and in the second mode, demodulating the signal at the second node, temporarily storing the demodulated signal in a buffer at the second node, then reading the stored signal from the buffer, using the stored signal to modulate a carrier signal, and transmitting the modulated carrier signal through the second device at the second node.

8. The method of claim 7, wherein the first device and the second device are antennas.

9. The method of claim 7, wherein the first device is an antenna and the second device is a cable.

10. The method of claim 7, wherein the first device is a cable and the second device is an antenna.

11. The method of claim 7, wherein in the second mode, the signal is read from the buffer while still being received through the first device.

12. The method of claim 7, wherein the wireless communication network is a mobile wireless communication network and said first, second, and third nodes are base stations.

* * * * *